(12) United States Patent
Marsden

(10) Patent No.: US 11,018,966 B2
(45) Date of Patent: May 25, 2021

(54) PROVIDING CONNECTIVITY INFORMATION

(71) Applicant: ESEYE LIMITED, Surrey (GB)

(72) Inventor: Ian Marsden, Surrey (GB)

(73) Assignee: Eseye Limited, Guildford (GB)

( * ) Notice: Subject to any disclaimer, the term of this patent is extended or adjusted under 35 U.S.C. 154(b) by 103 days.

(21) Appl. No.: 15/940,317

(22) Filed: Mar. 29, 2018

(65) Prior Publication Data

US 2018/0287913 A1    Oct. 4, 2018

(30) Foreign Application Priority Data

Mar. 31, 2017    (GB) .................................... 1705222

(51) Int. Cl.
| | |
|---|---|
| *G06F 15/173* | (2006.01) |
| *H04L 12/26* | (2006.01) |
| *G06F 16/13* | (2019.01) |
| *G06F 16/182* | (2019.01) |
| *H04W 4/20* | (2018.01) |
| *H04W 8/22* | (2009.01) |
| *H04W 4/70* | (2018.01) |
| *H04W 40/24* | (2009.01) |
| *H04W 12/02* | (2009.01) |
| *H04W 40/12* | (2009.01) |

(Continued)

(52) U.S. Cl.
CPC .......... *H04L 43/0811* (2013.01); *G06F 16/13* (2019.01); *G06F 16/183* (2019.01); *H04W 4/20* (2013.01); *H04W 4/70* (2018.02); *H04W 8/22* (2013.01); *H04W 12/02* (2013.01); *H04W 40/06* (2013.01); *H04W 40/12* (2013.01); *H04W 40/20* (2013.01); *H04W 40/24* (2013.01); *H04W 40/246* (2013.01); *H04W 40/248* (2013.01); *H04W 4/14* (2013.01)

(58) Field of Classification Search
CPC ..... H04L 43/0811; H04L 4/14; H04L 40/248; H04L 40/246; G06F 16/183; G06F 16/13; H04W 4/70; H04W 4/20; H04W 8/22; H04W 12/02; H04W 40/06; H04W 40/12; H04W 40/20; H04W 40/24
USPC ......................................................... 709/224
See application file for complete search history.

(56) References Cited

U.S. PATENT DOCUMENTS

| | | | |
|---|---|---|---|
| 9,185,170 B1 | 11/2015 | Grammel et al. | |
| 2004/0210835 A1* | 10/2004 | Kurumatani | G06F 40/14 |
| | | | 715/236 |

(Continued)

FOREIGN PATENT DOCUMENTS

| | | |
|---|---|---|
| EP | 2533463 | 12/2012 |
| EP | 2753133 A2 | 7/2014 |
| GB | 2504968 | 2/2014 |

OTHER PUBLICATIONS

EP 18164010.3; Communication Pursuant to Article 94(3) EPC; dated Apr. 22, 2020; 13 pages.

*Primary Examiner* — Alan S Chou
(74) *Attorney, Agent, or Firm* — Kilpatrick Townsend & Stockton LLP

(57) ABSTRACT

According to a concept of the invention, there is proposed a method of providing connectivity information of a mobile device to an end server, wherein a connectivity monitoring device obtains the connectivity information, monitors a communication channel between the mobile device and end sever, and stores the connectivity information on the end server.

13 Claims, 4 Drawing Sheets

(51) Int. Cl.
  *H04W 40/20* (2009.01)
  *H04W 40/06* (2009.01)
  *H04W 4/14* (2009.01)

(56) References Cited

U.S. PATENT DOCUMENTS

2010/0284390 A1* 11/2010 Lee .................. H04W 8/22
                                                     370/338
2012/0084344 A1   4/2012 Kalyanasundaram et al.

* cited by examiner

PROVIDING CONNECTIVITY INFORMATION

CROSS-REFERENCE TO RELATED PATENT APPLICATIONS

The present application claims priority under 35 U.S.C. § 119 to British Patent Application No. 1705222.6, filed Mar. 31, 2017, which is hereby incorporated by reference in its entirety.

FIELD OF INVENTION

The invention relates to methods of providing an end server with connectivity information of a mobile device.

BACKGROUND TO THE INVENTION

It has become increasingly desirable to provide mobile devices capable of communicating with an end server, such as a server farm or a cloud-computing network. Such mobile devices have become more popular with the development of the internet of things, to enable various physical devices to communicate with a central server. These mobile devices typically communicate with the end server over one or more networks or communication channels, preferably using a wireless communication system. Some known communication channels include the internet, GSM, 3G networks, 4G networks and the like.

Often, such devices only connect intermittently with the end server, to avoid taking up too much network resource. For this reason, the end server may obtain information from the mobile device and store it in a local file on the server. When it is required to access information about the mobile device, there is no need to form a communication link to the mobile device, rather all that is required is to access the local file.

The information in such a file is updated by communication with the mobile device. For example, if the mobile device is a smart meter, the end server may make a connection with the smart meter once a day to download meter readings and any other data collected by the smart meter. Systems such as billing systems but also marketing systems may access the data not by connecting to the smart meter but by accessing the local file.

Alternatively, where the local device is a vending machine, the server may have a local file reflecting the stocks of various products sold by the vending machine in the vending machine. Again, this can be updated once a day. Other programs can then access the local file to determine when it becomes necessary to restock the vending machine.

Such local files are updated by connecting to the mobile device and downloading data that reflects the local state of the mobile device.

SUMMARY OF THE INVENTION

There is provided a method according to claim 1.

In particular, there is provided a method of providing an end server with connectivity information of a mobile device able to wirelessly communicate with the end server, the method comprising: communicating between the end server and the mobile device through a communication pathway using a communication channel; monitoring the communication channel to collect connectivity information with a connectivity monitoring device outside of the communication pathway between the mobile device and the end server; passing the connectivity information from the connectivity monitoring device to the end server; and storing the connectivity information in an electronic file at the end server, wherein the electronic file represents the last known state of the connectivity information to the end server and wherein a portion of a communication pathway between the connectivity monitoring device and the end server is different to and independent from any portion of a communication pathway between the mobile device and the end server.

The inventors have realized that the mobile device itself does not have information corresponding to the communications link to and from the mobile device. Thus, in prior art arrangements the end server only stores information related to the mobile device, and its environment, not information relating to the communications link to the mobile device. Accordingly, a connectivity monitoring device, which may be associated with the mobile network, collects information about the connectivity and this is stored, and preferably updated, on the end server by a connectivity monitoring device.

By storing connectivity information this can be used by the end server to adjust how and how often the end server connects to the mobile device. For example, if the mobile device is in a location that can connect by a high capacity low cost network, then the end server may update the software in the mobile device. However, if the mobile device can only connect via a very slow network, or an expensive network, then the end server may engage in minimal communication with the mobile device.

Providing the electronic file on the end server allows the end server to access connectivity information of the mobile device, without having to directly communicate with the connectivity monitoring device or the mobile device. Thus, a potentially expensive communication pathway or link between the end server and the connectivity monitoring device, such as a separate or dedicated application programming interface (API), need not be used. This also increases data security.

Furthermore, the connectivity monitoring device may be privy to information which is not accessible to either the mobile device or the end server alone. By way of example, the mobile device may be unable to identify a cost, identity or any other characteristic of a communication channel between the mobile device and end server. The connectivity monitoring device may obtain this information from an algorithm, or obtain such information from an intermediary device connecting the mobile device to the end server (e.g. a base station or core network).

Use of a connectivity monitoring device to monitor the communication channel and provide the end server with connectivity information removes the burden of doing the same from the mobile device and/or end server.

Preferably, the connectivity monitoring device is adapted to adjust at least one communication channel between the mobile device and the end server based on the connectivity information. Consequently, the mobile device may be switched from one communication channel to another communication channel.

Use of a connectivity monitoring device to adjust a communication channel of the mobile device allows for data, information or algorithms unavailable to the mobile device, e.g. by reason of processing power or security, to be used to modify the channel.

Note that the step of monitoring the communications channel need not take place synchronously with communicating between the end server and the mobile device through the channel. The channel may be monitored separately.

In embodiments, the mobile device communicates with a mobile telephone base station along the communication channel using a main channel and a side channel, wherein the communications pathway between the end server and the mobile device is along the main channel and the mobile device communicates with the connectivity monitoring device using a side channel.

In this way, connectivity information may be built up using a side channel which may be for example a USSD channel or other side channel which may avoid the cost or overhead of the main channel which may be a 2G, 3G, 4G, 5G or other main mobile communication channel.

Preferably, during the step of communicating between the end server and the mobile device the end server updates a further electronic file with status information relating to the mobile device. The end server may accordingly have two files, one relating to the connectivity information, and one relating to the status information of the mobile device, i.e. the data associated with the local mobile device and its operation. By maintaining two separate files, it is possible to maintain separate security controls on the two files.

In alternative embodiments, a single electronic file on the end server may store both the status information and the connectivity information.

Optionally, the connectivity monitoring device may be adapted to adjust an operation of at least one communication channel between the mobile device and the end server. In particular, the connectivity monitoring device may define, restrict or control a manner in which the mobile device and/or the end server may communicate based on the connectivity information. For example, the connectivity monitoring device may instruct the mobile device to limit requests to only low-bandwidth requests or requests for data below a certain bandwidth (such as requesting only low resolution images or essential services from the end server) if a bandwidth of a communication channel is below a predetermined threshold.

In some embodiments, the connectivity monitoring device is adapted to update the connectivity information stored on the end server. As a copy of the connectivity information is stored on the end server, it has been recognized that the connectivity monitoring device may advantageously only update such stored data to reflect a change to the connectivity information. In particular, the connectivity monitoring device may push or pass update information detailing changes to the end server.

Such an embodiment may reduce the amount of data that needs to be passed between the end server and the connectivity monitoring device, thereby reducing the cost of a connection therebetween. Adjusting the connectivity information stored on the end server in this manner may also be quicker and more efficient than resending the entire connectivity information available to the connectivity monitoring device.

Preferably, the connectivity information is associated with security information. The connectivity monitoring device may be adapted to determine whether the end server is permitted to access the connectivity information based on the security information. Thus, a security and/or privacy of the user of the mobile device (and of operators of any communication channels used by the mobile device) may be maintained.

In at least one embodiment, the security information is assigned to the mobile device by the connectivity monitoring device. The assigned security information may be obtained from the end server.

The connectivity monitoring device may be adapted to retrieve the security information from the mobile device, and determine whether the end server is permitted to access the information (i.e. whether the connectivity information may be stored/updated on the end server) based on the retrieved security information. By way of example only, the security information retrieved from the mobile device may be compared to second security information obtained from an end server; wherein if the two correlate to one another, the end server is permitted to access the connectivity information.

The connectivity information may be anonymized and shared with other mobile devices, end servers and/or connectivity monitoring modules. This may provide said devices with additional information for determining how the mobile device and the end server are to communicate with one another.

By way of example, a first mobile device may be sent anonymized connectivity information of a second mobile device in a similar scenario (e.g. a same location or connected to a same router/base station). Based on the anonymized connectivity information, the first mobile device may determine to operate on or adjust a communication channel appropriately.

In an embodiment, connectivity information stored on the end server may be retrieved by the connectivity monitoring device. This may occur, for example, in the event of a loss of data by the connectivity monitoring device. In another example, the end server may be adapted to edit or alter the connectivity information stored on the end server, which may be recognized and retrieved by the connectivity monitoring device.

Thus, the end server may be able to communicate with the connectivity information by altering the connectivity information stored at the end server. The end server may not, therefore, need to directly communicate with the connectivity monitoring device to provide instructions or messages to the connectivity monitoring device.

Such an embodiment may allow the end server to bring about a change in at least one communication channel between the mobile device and the end server, without having to actively contact or communicate with the connectivity monitoring device.

Preferably the mobile device communicates with the connectivity monitoring device over a first communication channel, and the mobile device communicates with the end server over a second, different communication channel.

In some embodiments, at least one communication channel between the mobile device and the connectivity monitoring device is different to a communication channel between the mobile device and the end server.

Preferably, the mobile device and the end server are able to communicate independently of the connectivity monitoring device. As a consequence, in the event the connectivity monitoring device was turned off, the mobile device and the end server may still communicate.

Optionally, the method may also comprise storing the connectivity information in an electronic file at the connectivity monitoring device, wherein the electronic file at the end server mirrors the electronic file at the connectivity monitoring device.

Thus, the connectivity monitoring device may store its own copy of the connectivity information. Changes to the connectivity information stored in the connectivity monitoring device may be relayed to the end server and vice versa, such that connectivity information stored by both the connectivity monitoring device and the end server mirror one another (i.e. are substantially the same).

There is also proposed a connectivity monitoring device according to claim 10. A wireless network is proposed comprising such a connectivity monitoring device and an end server. The wireless network may optionally comprise a mobile device adapted to communicate with the end server.

BRIEF DESCRIPTION OF THE DRAWINGS

An example of the invention will now be described with reference to the accompanying diagrams, in which.

DETAILED DESCRIPTION

According to a concept of the invention, there is proposed a method of providing connectivity information of a mobile device to an end server, wherein a connectivity monitoring device obtains the connectivity information, monitors a communication channel between the mobile device and end sever, and stores the connectivity information on the end server.

Embodiments are at least partly based on the realization that connectivity information may be stored as a shadow or data file on the end server, analogously to a device shadow or thing shadow. In particular, it is recognized that a dedicated device that monitors and controls a communication channel between a mobile device and an end server may update connectivity information stored at the end server.

As used herein, a communication channel is used to refer to a single communication link between a first device and a second device, such as a single wire or single wireless connection. The term communication pathway is used to refer to the entire communication system which communicatively connects one device to another (e.g. via zero or more further devices), and may comprise one or more communication channels.

Figure 1:
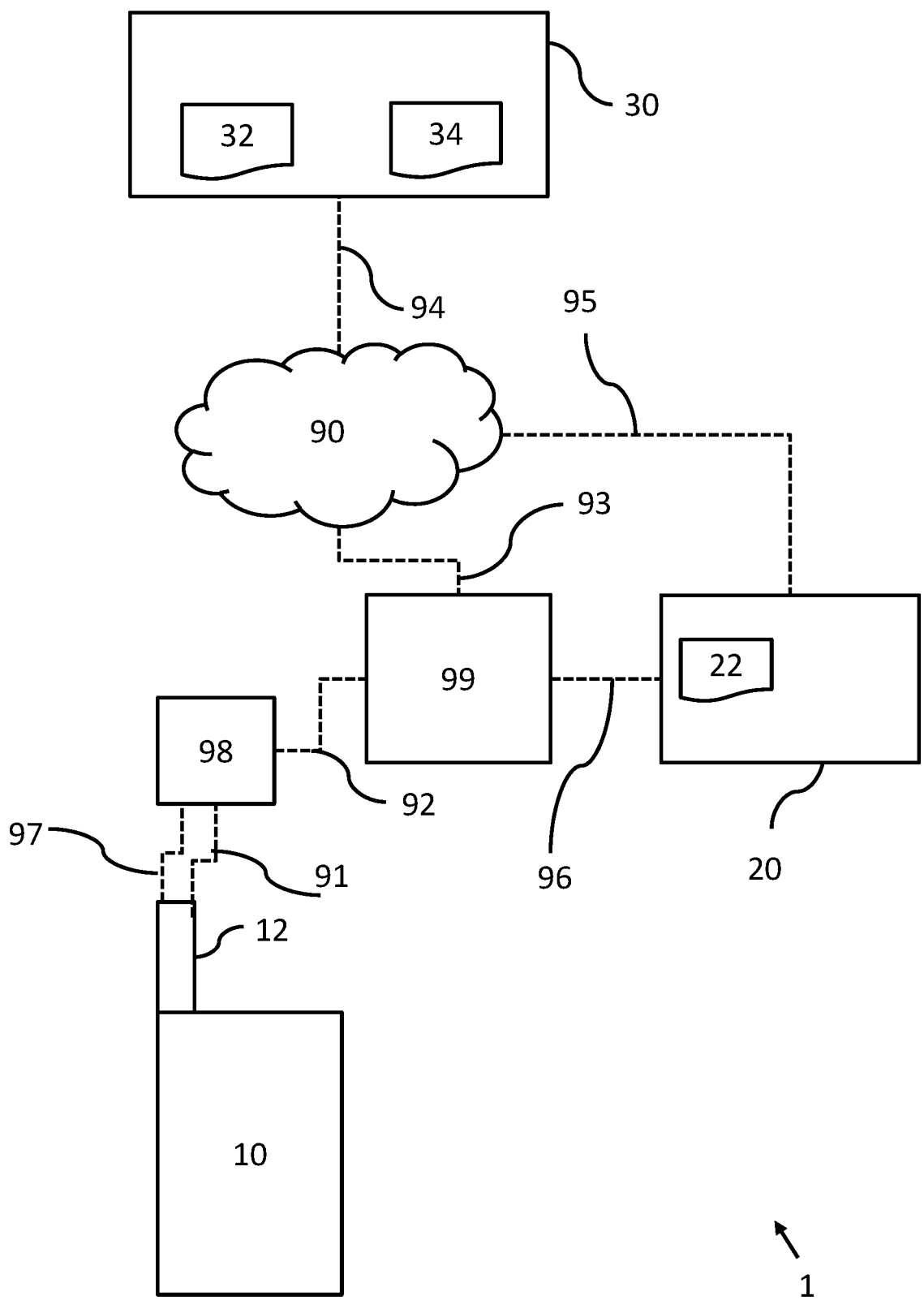
FIG. 1 illustrates various components of a wireless network system.

FIG. 1 illustrates a wireless network system 1 comprising a mobile device 10, e.g. a mobile/cell phone, a connectivity monitoring device 20 and an end server 30.

The mobile device 10 communicates with the end server 30, which may provide certain services (e.g. cloud-based services) to the mobile device 10. The mobile device 10 is adapted to communicate with the end server 30 over one or more communication channels.

The connectivity monitoring device 20 obtains or collects connectivity information of the mobile device 10 and may thereby monitor at least one communication channel between the mobile device 10 and the end server 30. The connectivity information may, for example, be obtained directly from the mobile device 10 and/or from a network over which the mobile device communicates. There may thereby be provided a connectivity monitoring device 20 adapted to monitor a network, communication channel or communication pathway which the mobile device 10 uses to communicate with the end server.

The connectivity monitoring device 20 is also adapted to communicate with the end server 30 over one or more communication channels, and store the connectivity information in an electronic file at the end server 30.

In the wireless network system 1, a complete communication pathway between the mobile device 10 and the end server 30 comprises a first communication channel 91 connecting the mobile device to a base station 98, a second communication channel 92 connecting the base station 98 to a core network 99, a third communication channel 93 connecting the core network to the internet 90, and a fourth communication channel 94 connecting the internet 90 to the end server (e.g. an Ethernet connection). The base station 98, core network 99 and internet 90 may be considered to form the intermediary or routing devices between the mobile device 10 and the end server 30.

Preferably, the first communication channel 91 is a wireless communication channel operating according to a wireless communication protocol. This preferably includes a mobile or cellular network. In particular, at least one communication channel between the mobile device 10 and the end server 30 is wireless. The mobile device 10 may communicate with the base station 98 using a wireless communication arrangement 12, for example, comprising an antenna.

A communication pathway between the connectivity monitoring device 20 and the end server 30 may comprise a fifth communication channel 95 coupling the connectivity monitoring device 20 to the internet 90 and the third communication channel 94.

Thus, at least one communication channel between the connectivity monitoring device 20 and the end server 30 is different to and independent from any one of the communication channels between the mobile device and the end server. Thus, a portion of the communication pathway between the connectivity monitoring device 20 and the end server 30 is different to any portion of the communication pathway between the mobile device 10 and the end server 30.

For example, the fifth communication channel 95 over which the connectivity monitoring device communicates with the end server 30, is not contained in a communication pathway (i.e. the combination of the communication channels 91, 92, 93, 94) between the mobile device 10 and the end server 30. Thus, a communication between the mobile device 10 and the end server 30 is not routed via the connectivity monitoring device 20.

As illustrated herein, in some embodiments, messages transmitted from and received by the mobile device 10 may be routed via the base station 98. In particular, the base station 98 may route messages for/from the mobile device 10 via a core network 99. Thus, messages transmitted from and received by the mobile device 10 may be routed via the core network 99 and the base station 98, which may be considered to be intermediary or routing devices.

Various optional modules of the core network 99, such as a base station controller (BSC), mobile switching center (MSC), gateway mobile switching center (GMSC), and general packet radio service network (GPRS network), e.g. including gateway GPRS support nodes (GGSN) and serving GPRS support nodes (SGSN), have been omitted for the sake of brevity. The core network 99 may operate according to known protocols, including GSM, GPRS and UTMS. The skilled person would be readily capable of implementing such modules into embodiments.

The connectivity monitoring device 20 may obtain the connectivity information over a sixth communication channel 96. For example, the connectivity information may be transmitted from the mobile device 10 via the base station 98 and core network 99. In other examples, the connectivity information is obtained from intermediary or routing devices, such as the base station 98 or core network 99.

In some embodiments, the mobile device 10 may communicate with the connectivity monitoring device 20 over one or more communication channels. This communication may be exploited by the connectivity monitoring device to obtain the connectivity information.

The mobile device 10 is preferably adapted to communicate with the connectivity monitoring device 20 using at least one different communication channel than that used to communicate with the end server, such as sixth communication channel 96. Thus, a total communication pathway between the mobile device 10 and the end server 30 may not include at least one communication channel between the mobile device and the connectivity monitoring module 20.

By way of example, the mobile device 10 may communicate (via the base station 98) with the end server 30 over a first, primary channel, 93 (here the third communication channel) for example, using a 4G communication protocol, whereas the mobile device 10 may communicate (via the base station 98) with the connectivity monitoring device 20 using a side-channel 96 (here a sixth communication channel 96), such as a GSM channel. Use of a side channel may include, for example, sending messages according to protocols such as Unstructured Supplementary Service Data (USSD) or Short Message Service (SMS). The side channel may, alternatively or additionally, be associated with a different access point to that of the first, primary channel.

Such embodiments advantageously permit the mobile device to ensure communication with the connectivity monitoring device 20 is maintained, even in areas of low mobile signal strength or where only a basic 2G network is available (which typically still permit communication in such side-channels). Furthermore, some networks may permit the sending of messages using a side channel (e.g. to the connectivity monitoring device 20), but may not allow sending of messages using a primary channel (e.g. 4G communication), for example, due to lack of permission.

Of course, in some embodiments, the mobile device 10 is adapted to communicate with the connectivity monitoring device using a same protocol as that used to communicate with the end server. However, it will be apparent that information for the connectivity device is not routed via the end server or vice versa, such that the complete communication pathway between the mobile device and the connectivity monitoring device does not comprise the complete communication pathway between the mobile device and the end server.

Optionally, the connectivity monitoring device 20 may communicate with the mobile device. In this way, the connectivity monitoring device may control which one or more networks or communication channels the mobile device 10 uses to communicate with the end server 30. Thus, the connectivity monitoring device may obtain connectivity information of the mobile device and on the basis of said connectivity information: change a communication channel, alter how the communication channel is used, alter a behavior of the mobile device or adjust a manner of communication.

By way of example, a connectivity monitoring device may be adapted to provide a mobile device with network selection data, to prompt the mobile device to change a communication channel (e.g. to one operated by a different network provider), or possibly a new identifier (e.g. a new IMSI) to enable the mobile device to connect to a preferred or more efficient communication channel.

The connectivity monitoring device 20 may be adapted to instruct the mobile device 10 to change how it communicates with the end server 30. In particular, the connectivity monitoring device 20 may control a type of information that is communicable between the mobile device 10 and the end server 30. By way of example, the connectivity monitoring device may, if a communication channel has only a low bandwidth, only permit the mobile device to only request a stream of standard-definition video rather than high-definition video.

Figure 2:
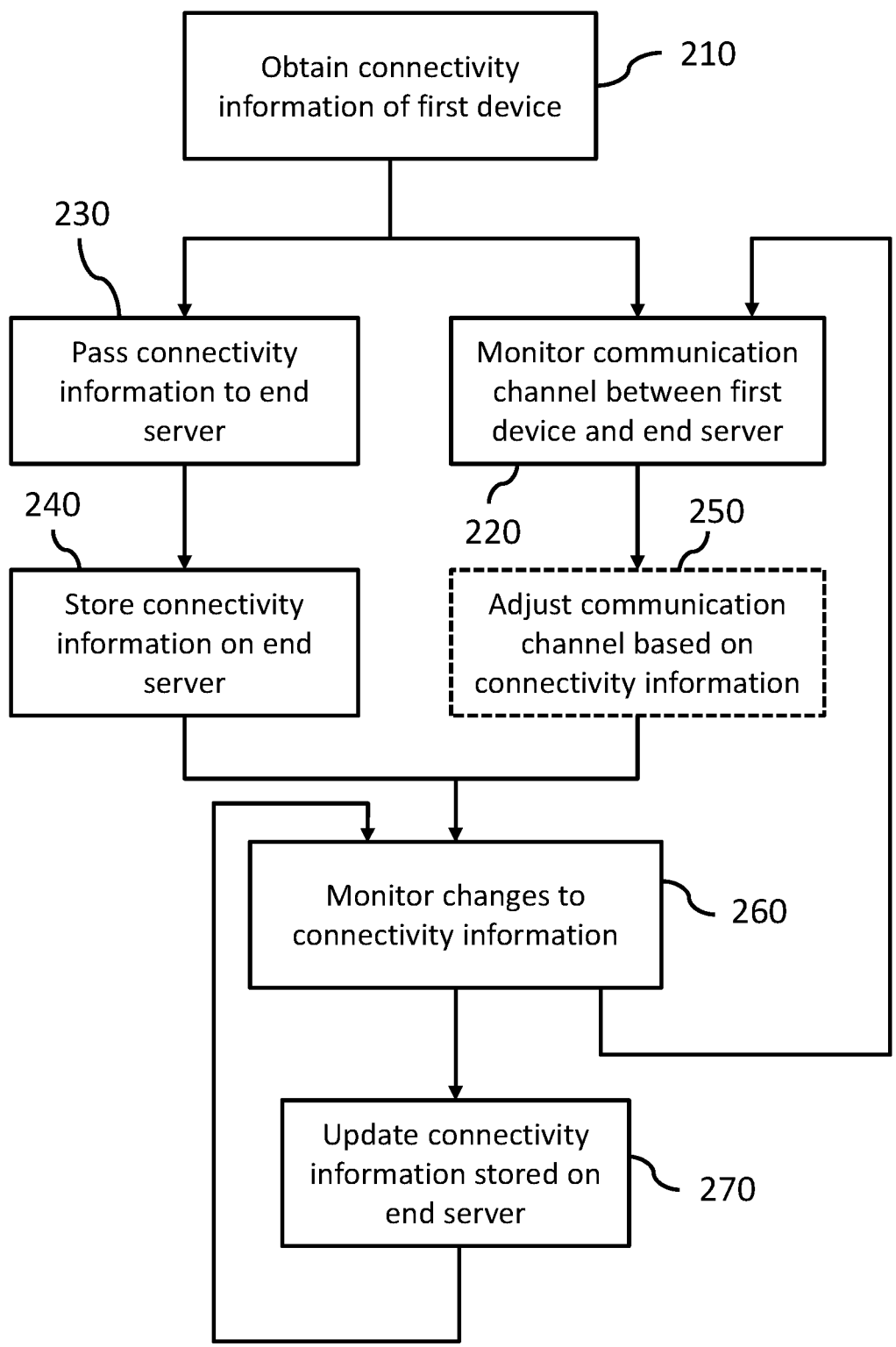
FIG. 2 is a flow diagram of a method according to an embodiment.

With further reference now to FIG. 2, a method according to an embodiment may be understood. The connectivity monitoring device 20 obtains 210 connectivity information of the mobile device 10. The connectivity information may comprise, for example, environment information or location information. Typically, environment information includes information about which networks are available and the signal strength of those networks. Location information may include information about a global position of the mobile device 10 (e.g. longitude and latitude, or an identification of a country).

The connectivity monitoring device 20 may obtain the connectivity monitoring information from the mobile device 10. For example, the mobile device may transmit connectivity information to the connectivity monitoring device. In some examples, the mobile device 10 may periodically transmit such information (e.g. every hour, every two hours etc.). In other or further examples, the mobile device 10 receives an information request from the connectivity monitoring device 20, and transmits connectivity information as a response.

In other or further embodiments, the connectivity monitoring device 20 may obtain connectivity information from other components of the wireless network 1. Thus, the connectivity monitoring device may obtain connectivity information from the core network 99, the base station 98 or even the end server 30. Information obtained from these sources may include a location (of the mobile device or a communication channel), packet loss or signal strength. The connectivity device 20 is therefore not limited to receiving or obtaining connectivity information from the mobile device 10 alone.

In at least these ways, the connectivity monitoring device 20 may monitor 220 a communication channel over which the mobile device 10 communicates with the end server 30 to collect the connectivity information of the mobile device.

As illustrated in at least FIG. 1, at least one communication channel 96 over which the connectivity monitoring device 20 obtains the connectivity information may be different to any one of the communication channels 91, 92, 93, 94 between the mobile device 10 and the end server 30. In particular, a communication channel over which the connectivity monitoring device obtains connectivity information (such as sixth communication channel 96) may be different to a communication channel over which the end server 30 communicates with the mobile device 10 (such as communication channels 91, 92).

Thus, a communication between the mobile device 10 and the end server 30 need not be routed via the connectivity monitoring device 20, and a possible communication between the mobile device 10 and the connectivity monitoring device 20 need not be routed via the end server.

In some embodiments, the connectivity monitoring device does not directly communicate with the mobile device 10, and may, for example, obtain connectivity information from an intermediary device 98, 99 between the mobile device 10 and the end server 30. In other embodiments, the connectivity monitoring device 20 directly obtains connectivity information from the mobile device 10 via the intermediary devices. Of course, it is conceivable that the connectivity monitoring device may obtain connectivity information from both these sources and optionally combine said connectivity information.

The connectivity monitoring device 20 optionally adjusts 250 or updates a communication channel between the mobile device 10 and the end server 30 (e.g. changes which network the mobile device operates on) based on the connectivity information. This may be performed by the connectivity monitoring device providing an instruction to the mobile device. Conceivably, it may be performed by the connectivity monitoring device providing an instruction to the base station 98 or the core network 99, for example, to switch from a communication channel conventionally used by the base station 98 or core network 99.

In some embodiments, the connectivity monitoring device adjusts a behavior of the mobile device based on the connectivity information, for example, restricting what data or messages may be transmitted, requested or received by the mobile device.

In one example, the mobile device 10 may send an update request to connectivity monitoring device 20 via the base station 98, wherein the update request includes the connectivity information. Preferably, this request updates or changes at least one communication channel over which the mobile device 10 communicates with the end server 30.

In more detail, the connectivity monitoring device 20 may receive the update request, including the connectivity information, and reply with an update message which updates at least one communication channel, typically by providing updating network selection information. Alternatively, or additionally, a new IMSI may be provided if required to access an available network.

By way of example, the update message may comprise an indicator of a new communication channel to replace the first communication channel 91 (between the mobile device and the base station).

By way of further example, the base station 98 may communicate with a home location register, HLR, positioned in the core network 99, to authenticate a mobile device 10 (e.g. based on an IMSI) with regard to a particular network according to known procedures. The HLR may permit the mobile device 10 to communicate on the particular network or prevent the mobile device 10 from communicating on the particular network. In the event the mobile device 10 is not permitted to communicate on the particular network, the mobile device 10 may communicate this to the connectivity monitoring device 20 (i.e. in the connectivity information). The connectivity monitoring device 20 may provide an indication of a different network to connect to, or provide a new IMSI for the mobile device so as to operate on the particular network.

The connectivity monitoring device 20 may be able to use information unavailable to the mobile device 10, or use complex algorithms not executable on the mobile device 10, to establish the optimal communication channel. Thus, a burden of how to determine with which communication channel the mobile device 10 communicates is switched from the mobile device 10 (or a user of the mobile device) to the connectivity monitoring device 20 allowing a design of the mobile devices to be simplified. Furthermore, the connectivity monitoring device 20 may provide information, such as a new IMSI (from a bank of IMSIs), enabling the mobile device 10 to communicate over a previously unavailable (e.g. due to lack of permission) communication channel.

For example, the connectivity monitoring device 20 may calculate, for a mobile device 10, a network selection algorithm for that device based on the connectivity information. The result may depend on a number of factors, including cost, and reliability of networks available to the network device. This is particularly important for devices that have to function reliably. The calculation may take into account whether the reliability is required in a number of different locations, such as medical monitoring software, or in a fixed location, as may be the case for a data logger.

The connectivity monitoring device 20 is adapted to pass 230 the connectivity information to the end server 30 and store 240 (a copy of) the connectivity information of the mobile device on the end server. In particular, the connectivity monitoring device 20 stores the connectivity information in a first electronic file 32 located at the end server 30.

The connectivity monitoring device 20 may supplement the connectivity information (passed to the end server 30) with additional information, such as payment details, a time of retrieving the connectivity information and so on.

In this way, the end server 30 has immediate access to the connectivity information, which it may use to its own end. In particular, the end server 30 need not directly communicate with the connectivity monitoring device 20 when it wishes to read connectivity information, but may rather consult the connectivity information stored in the first electronic file 32 at the end server 30.

The first electronic file 32 may be considered to be a shadow of the connectivity information, in an analogous manner to a device shadow or thing shadow. Thus, the first electronic file 32 may represent the last known state (to the end server 30) of the connectivity information.

The first electronic file 32 may be in any suitable format, such as: JSON (JavaScript Object Notation); XML (Extensible Markup Language); SGML (Standard Generalized Markup Language) or possibly as a text file.

The end server 30 may use the connectivity information, for example, to determine whether to provide certain services or technologies to the mobile device 10. By way of example, the connectivity information may indicate a location of the mobile device 10, and the end server 30 may be adapted to only make certain services available to devices in a particular location. In another example, the end server may be adapted to limit non-essential services or advertising to a mobile device base on, for example, a quality of a connection or a cost of a connection. In such an example, if a mobile device connects over an expensive (e.g. cost or bandwidth) link, the end server may be adapted to only provide the necessary data for providing services or essential services to the mobile device, whereas if a mobile device connects over a cheap link, the end server may provide additional services or further (e.g. advertising) information.

The connectivity monitoring device 20 may store its own version of the connectivity information on a storage arrangement of the connectivity monitoring device 20. Thus, the first electronic file 32 may represent or mirror an original electronic file 22 located at the connectivity monitoring device 20. The connectivity monitoring device 20 may, for example, store connectivity information at the original electronic file 22 before storing the connectivity information at a first electronic file 32 of the end server 30.

It may therefore be understood that there is a first copy of the connectivity information, stored at an original electronic file 22 at the connectivity monitoring device, and a second copy of the connectivity information, stored at the first electronic file 32 of the end server 30.

Preferably, the connectivity monitoring device 20 is adapted to monitor 260 or detect changes to the connectivity information. The connectivity monitoring device 20 may push updates 270 to the end server 30 when a change in the connectivity information is detected. For example, if a signal strength of available networks to the mobile device 10 changes, the connectivity monitoring device 20 may update the connectivity information stored in the first electronic file 32 with this information.

Thus, the connectivity monitoring device 20 may update 270 connectivity information stored in the first electronic file 32 on the end server, based on changes in the connectivity information.

This advantageously provides a reduced data overhead for the system, as only updates to connectivity information need to be pushed by the connectivity monitoring device 20 to the end server 30, rather than replacing the entire first electronic file 32 storing the connectivity information.

Optionally, the connectivity monitoring device 20 updates the connectivity information stored in the first electronic file 32 in response to a change in the connectivity information of the mobile device 10. In other embodiments, the connectivity monitoring device may only update the stored connectivity information periodically, for example, every thirty minutes or every hour.

Similarly, it will be apparent that the connectivity monitoring device 20 may update the connectivity information contained in the original electronic file 22 stored at the connectivity monitoring device.

Of course, it will be appreciated that the original electronic file 22 and the first electronic file 32 may differ slightly if, for example, the original electronic file 22 has been updated, and the connectivity monitoring device has not yet updated the connectivity information stored in the first electronic file.

The end server 30 may also be adapted to alter, edit or update the connectivity information stored in the first electronic file 32. The connectivity monitoring device 20 may be adapted to identify such updated information, and act accordingly. Thus, the end server 30 may pass a message to the connectivity monitoring device 20 by adjusting the first electronic file 32, where the connectivity monitoring device 20 adjusts a communication channel, or alters a behavior of the mobile device, based on the altered first electronic file 32.

Thus, the connectivity monitoring device 20 may be adapted to periodically query or access the first electronic file 32 to identify if the end server has adjusted the connectivity information. The connectivity monitoring device 20 may use such adjusted connectivity information to instruct the mobile device 10 to alter its communication channel.

Alternatively, the connectivity monitoring device 20 may be adapted to identify changes in the stored connectivity information only when updating such stored connectivity information.

Embodiments thereby allow the end server 30 to influence at least one communication channel between the mobile device 10 and the end server 30.

For example, the end server 30 may provide an indication of a time of scheduled maintenance of a particular communication channel, and the connectivity monitoring device 20 may use this indication to alter a communication channel between the mobile device 10 and the end server 30, thereby maintaining an uptime of the mobile device 10.

In another example, the end server 30 may request the connectivity monitoring device 20 to restrict a communication channel associated with the mobile device, e.g. for reasons of non-payment or changes in permissions. Potentially, the end server 30 may instruct the connectivity monitoring device 20 to disallow the mobile device to communicate on any network. In some scenarios, for example, if the mobile device comprises medical monitoring equipment it may not be appropriate to stop all functionality if a bill remains unpaid for a short period, but it may be appropriate to reduce functionality apart from emergency messages.

By way of further example, the end server 30 may be adapted to analyze and/or compare connectivity information associated with a plurality of different mobile devices. The end server 30 may determine pattern information of the connectivity information (e.g. mobile devices connecting via a particular network are associated with a high latency), and may pass the pattern information to the connectivity monitoring device 20 and/or mobile device 10.

In some embodiments, connectivity information associated with different mobile devices is sent to connectivity monitoring device for analysis. Preferably, this connectivity information is anonymized.

The stored first electronic file 32 may be made available to the mobile device 10. Thus, a user of the mobile device 10 may monitor or review the connectivity information by requesting the end server 30 to pass connectivity information to the mobile device 10. Preferably, the mobile device 10 is only permitted to read (i.e. not alter) the connectivity information.

In some embodiments, the stored first electronic file may be made available to a further, authorized device. Such a further device may be able to access a plurality of stored first electronic files (each associated with a different mobile device) in order to monitor the plurality of mobile devices. This may allow, for example, an administrator or manager to review/monitor a plurality of mobile devices (e.g. mobile/cell phones of employees)

The further, authorized device may be able to alter or adjust the first electronic file in order to enforce a change in at least one communication channel between the mobile device 10 and the end server 30.

The end server 30 may be adapted to store a second electronic file 34 comprising current state information of the mobile device 10. Thus, the end server 30 may store a device shadow or thing shadow, typically being a model of the device that reflects the last known state of the mobile device.

The mobile device 10 may update the current state information, and optionally retrieve messages from the second electronic file, when communicating with the end server 30. Thus, the end server 30 may indicate a desired change of state of the mobile device 10 (to the mobile device 10) by adjusting the stored second electronic file. The mobile device 10 may consult the stored second electronic file to receive messages (and change state accordingly), and also provides updates on the current state information of the mobile device 10.

Use of such a second electronic file 34 (device/thing shadow) ensures that the mobile device 10 is not required to be online (i.e. connected to the end server) all the time. Rather, the mobile device 10 need only periodically or sporadically communicate with the end server 30 to receive instructions and provide an update. This may improve a power efficiency or reduce a power consumption of the mobile device.

Furthermore, the end server 30 need not request information over the potentially expensive communication pathway between the mobile device 10 and the end server 30, but may rather consult the stored second electronic file 34 if information about the mobile device is required.

Preferably, the first electronic file 32 and the second electronic file 34 are distinct from one another (i.e. two separate files). This may be for reasons of security, for example, to ensure that the connectivity monitoring device 20 is unable to access the current state information of the mobile device 10 from the end server 30. Thus, the connectivity monitoring device 20 may only be limited to processing connectivity information (e.g. and not user data of the mobile device). Such an embodiment may provide a greater anonymity for a user of the mobile device 10.

Of course, it will be appreciated that in other embodiments the first electronic file 32 and the second electronic file 34 are one and the same. In such embodiments, the end server 30 may restrict access of the connectivity monitoring device 20 to only a portion of the combined first and second electronic file 32, 34.

Of course, in other embodiments, the connectivity monitoring device 20 is permitted access to the combined file (or the second electronic file 34).

The end server 30 and/or the connectivity monitoring device 20 may store historic connectivity information of the mobile device (e.g. networks previously connected to the mobile device, or previous locations of the mobile device). Such historic information may be used to optimize the selection of an appropriate communication channel between the mobile device 10 and the end server 30. For example, if it is identified that the mobile device 10 is regularly made to switch away from a particular network, this may imply that the particular network is unreliable.

The connectivity information may be associated with first security information, such as a security certificate, password, verification code or encryption methodology.

Prior to passing the connectivity information to the end server 30, the connectivity monitoring device may request the end server 30 to provide first security information. The connectivity monitoring device may associate the first security information at least one of the mobile device 10 and the IMSI used by the mobile device 10 (if applicable). Thus, the connectivity information of the mobile device 10 may be associated with first security information.

Optionally, the connectivity monitoring device 20 independently verifies the first security information received from the end server 30 (e.g. using a trusted database) prior to associating the first security information with the connectivity information of the mobile device 10.

Alternatively, the connectivity monitoring device 20 may provide the mobile device 10 with the first security information (e.g. from an internal database) and similarly provide the end server with corresponding, second security information so as to enable the end server to be permitted to communicate with the mobile device.

The connectivity monitoring device may push the first security information to the mobile device 10. The mobile device 10 may, for example, store the security information at a SIM received by the mobile device 10. This allows for the same security information to be moved from device to device (e.g. by exchanging SIMs), to reduce overhead in providing communication between devices and the end server.

For subsequent communications with the end server 30, the connectivity monitoring device 20 may verify the end server's identity based on the first security information (associated with the connectivity information) and second security information (provided by the end server).

The connectivity monitoring device 20 may, for example, compare the second security information to the first security information associated with the connectivity information. If they correspond to one another, the connectivity monitoring device 20 may consider the end server 30 to be verified, and permitted to receive information about the mobile device 10. The connectivity monitoring device may thereafter continue to update/provide connectivity information to the end server.

It will be apparent that the first security information may also act as security information used to verify messages between the mobile device 10 and the end server 30. For example, the first security information may be associated with a device/thing shadow stored in the second electronic file 34 by the end server 30, and the mobile device 10 may validate the identity of the end server before updating/altering the device/thing shadow.

Thus, the security information associated with the connectivity information may be the same security information as that associated with the mobile device information (i.e. the current state information).

In at least one embodiment, the connectivity information of a mobile device may be shared between further mobile devices and/or end servers. In particular, the connectivity information of a mobile device may be anonymized and compared to anonymized connectivity information of other mobile devices.

Anonymized connectivity information may be sent to a mobile device and/or the connectivity monitoring module. By way of example, the anonymized connectivity information may be sent to a mobile device and/or connectivity monitoring module if the anonymized mobile device is in a same scenario as the mobile device (e.g. same location). The mobile device may be adapted to adjust how it communicates with the end server based on the anonymized connectivity information (e.g. connect to a different network identified by the anonymized connectivity information).

In some embodiments, the end server may be adapted to collate connectivity information associated with a plurality of mobile devices. The end server may be adapted to determine a pattern of particular communication channels (e.g. determine which communication channels are not operational) based on the collated connectivity information. This pattern of the particular communication channels may be passed to the connectivity monitoring device and/or the mobile device.

It will be recognized that at least one communication channel between the mobile device 10 and the end server 30 may also be used for the mobile device 10 to communicate with other devices or servers (e.g. via the internet). Thus, as the connectivity monitoring device 20 adjusts a communication channel between the mobile device 10 and the end server 30, so a communication channel between the mobile device 10 and other servers/devices may be changed.

Figure 3:
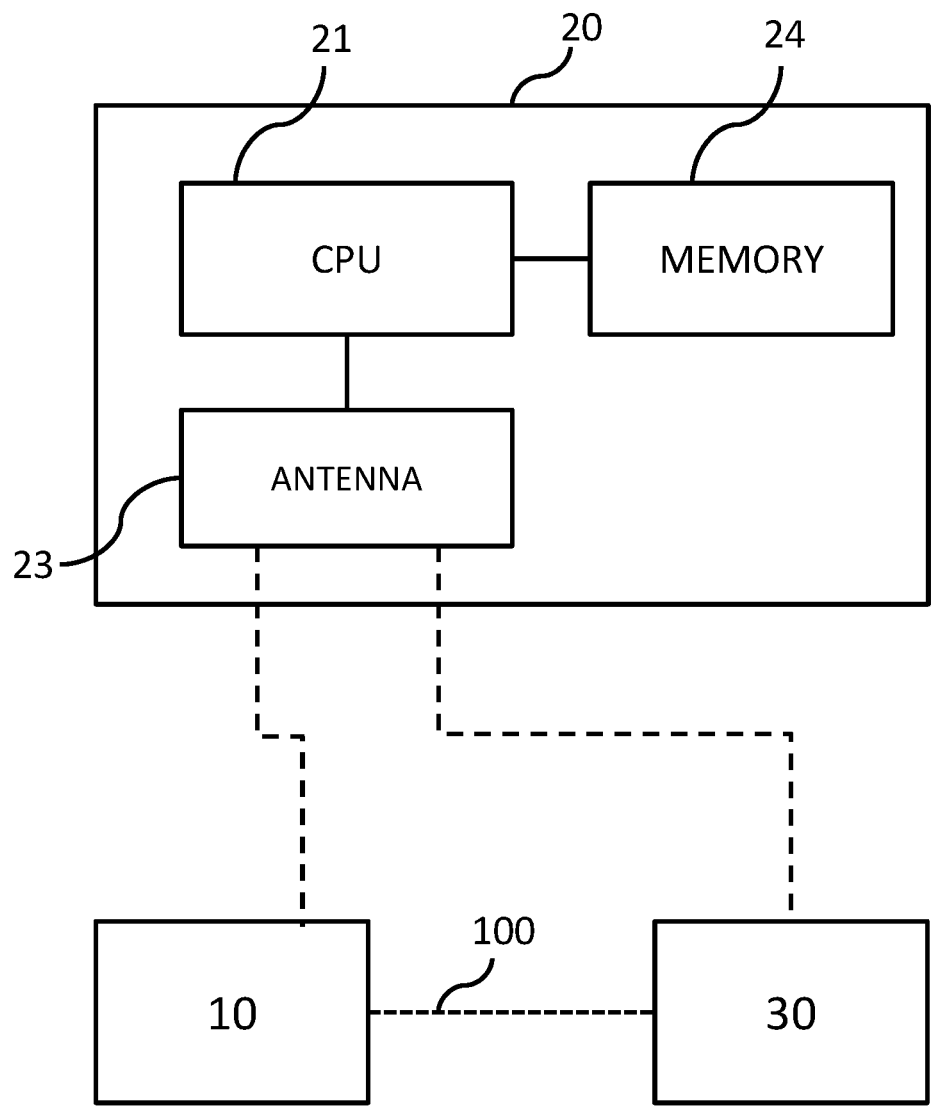
FIG. 3 illustrates a connectivity monitoring device according to an embodiment.

FIG. 3 illustrates an embodiment of a connectivity monitoring device 20. FIG. 3 also conceptually depicts the mobile device 10 and the end server 30, although the details of the communication pathways between the devices have been omitted for the sake of brevity.

The connectivity monitoring device may comprise a processor 21 or controller and a communication element 23 (e.g. comprising an antenna or port) adapted to communicate with the mobile device 10 and the end server 30.

The connectivity monitoring device 20 may also comprise a storage arrangement 24 containing computer readable program instructions (i.e. a computer program) thereon. The processor 21 may be adapted to execute the instructions contained by the storage arrangement to carry out a method as previously described. Thus, the storage arrangement 24 may comprise code (e.g. an application) adapted to cause the processor 21 to carry out methods described herein.

In particular, the processor 21 may be adapted to receive, via the communication arrangement 23, connectivity information of the mobile device 10. The processor may be adapted to monitor a communication channel of the mobile device (e.g. a communication channel 100 between the mobile device 10 and the end server 30) based on the received connectivity information and data stored in the storage arrangement 24 (such as an algorithm, or network information).

The storage arrangement 24 may store a copy of the connectivity information (e.g. an original electronic file). In some examples, the storage arrangement may also store historic versions of the connectivity information, which may be used to monitor a trend of the connectivity information.

The processor is adapted to pass connectivity information to the end server 30, via the communication arrangement 23. The end server 30 stores such connectivity information as previously described.

The processor 21 may further be adapted to, based on the connectivity information, adjust the communication channel of the mobile device. In particular, the processor may send, via communication element 23, instructions or supplementary information to the mobile device or to intermediary/routing devices between the mobile device and the end server.

The processor 21 may be adapted to, based on the connectivity information, request an adjustment to the behavior of the mobile device and/or intermediary/routing devices rather than or in addition to adjusting a communication channel.

Figure 4:
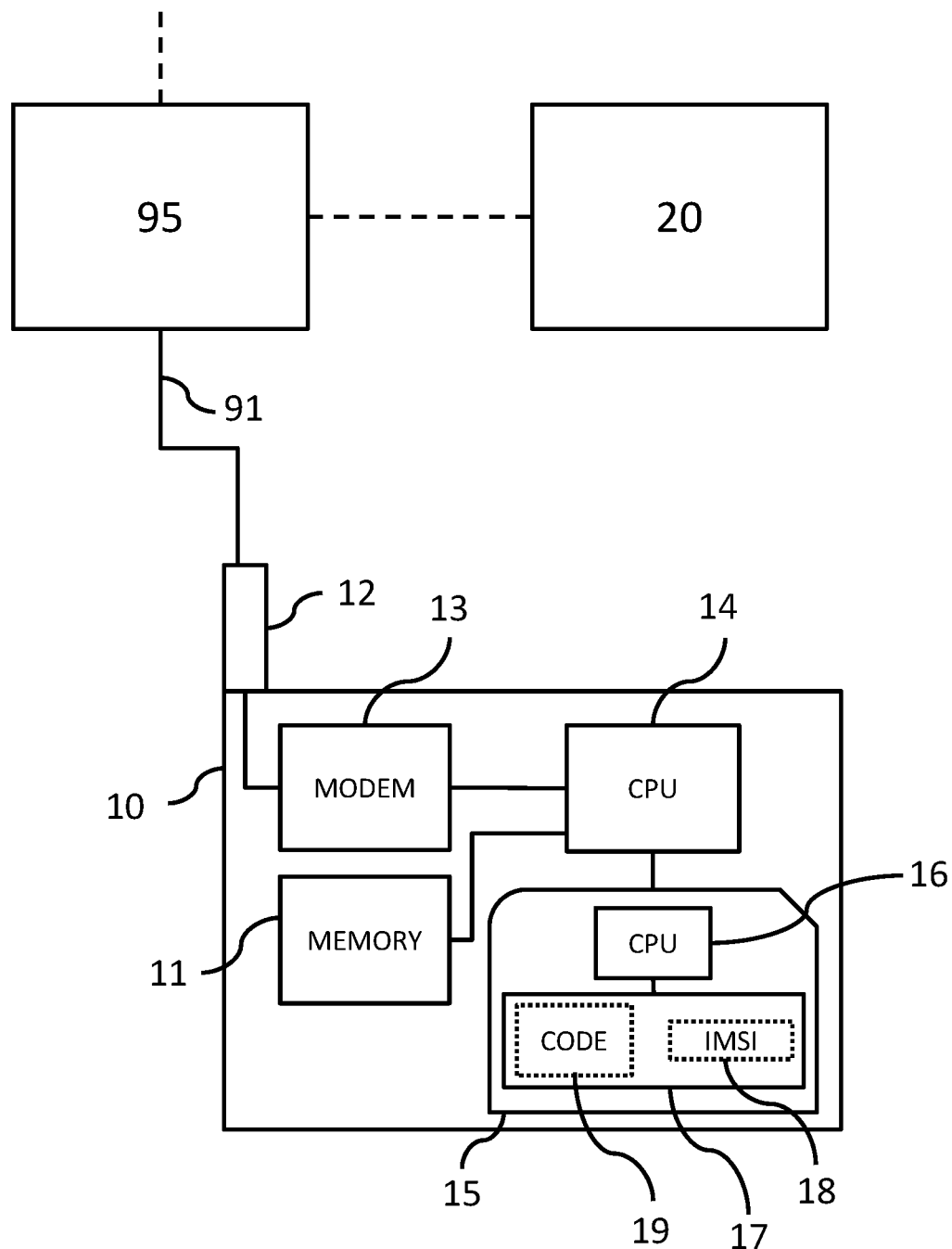
FIG. 4 illustrates a mobile device according to an embodiment.

FIG. 4 illustrates an embodiment of a mobile device 10 in the wireless network system of FIG. 1.

The mobile device 10 comprises a processor 14 and a memory 11. The memory 11 may contain code, such as an application program, which is executed by the processor 14 to carry out particular functions, as hereafter described. Thus, the memory 11 contains code for causing the processor to carry out the necessary communication and to carry out any additional programming required by the particular application.

The processor 14 is adapted to wireless communicate using a communication arrangement 12, here an antenna. Signals output by the processor 11 may be modulated onto a carrier wave transmitted by the communication arrangement using a modem 13, for example.

In particular, the processor 14 may be adapted to communicate with the connectivity monitoring device 20, via base station 98, connectivity information of the mobile device 10. Such connectivity information may be a part of an update request of the mobile device 10, issued by the mobile device 10 to request the connectivity monitoring device 30 to provide instructions on how to alter the communication channel 91.

Preferably, a computer program or code carried by the memory 11 may cause the processor 14 to supplement the connectivity information with identity information, in the form of a header for example, which identifies over which communication channel(s) the connectivity information is to be transmitted to the connectivity monitoring device.

As previously detailed, at least one communication channel between the mobile device and the connectivity monitoring device is different to a communication channel between the mobile device and the end server. In particular, data between the mobile device and the connectivity monitoring device is not routed via the end server, and similarly data between the mobile device and the end sever is not routed via the connectivity monitoring device.

This functionality may be provided by the code on the memory 11 of the mobile device 10 causing the processor 14 to provide different headers or identity information to identify how messages or information is to be routed to the different devices. For example, identity information may be interpreted by the core network 99 to route messages or information, such as the connectivity information, appropriately.

In at least one embodiment, different applications or programs run by the processor 14 of the mobile device 10 may be associated with different communication protocols or communication channels. By way of example, in a scenario in which the mobile device runs a first application, the mobile device 10 may instruct messages or information to be routed via a first communication channel, whereas if the mobile device runs a second application, the mobile device 10 may instruct messages or information to be routed via a second communication channel.

The protocol used by the mobile device 10 may determine how messages are routed (e.g. SMS or USSD). The mobile device 10 may be associated with multiple access point names (APNs), with different access point names used for different situations (e.g. a first for regular messaging, a second for network reporting).

In some embodiments, the mobile device 10 may be adapted to self-monitor at least one communication channel over which the mobile device 10 communicates, such as the first communication channel 91. In the event that the mobile device detects, for example, an irregularity or deficiency in the communication channel, it may issue an update request to the connectivity monitoring device 30.

The mobile device 10 may be adapted to receive instructions or supplementary information from the connectivity monitoring device 20, and switch or change a communication channel 91 based on such received information.

Furthermore, the mobile device 10 is adapted to receive and interact with a card 15 which stores, in memory 15, at least one IMSI 18 as well as code 19 for causing the card to carry out various functions as set out below. As previously described, the IMSI may provide an identity to the card 15. The code 19 may include in particular SIM apps, i.e. code for running on card 15.

In the embodiment shown, the card 15 also contains a processor 16, Thus, the card 15 may be referred to as a UICC (Universal Integrated Circuit Card) according to the 3G standard. However, such a card is frequently referred to as a SIM (Subscriber Identity Module) card and the present application interchangeably uses this terminology, and may refer to card 15 as a "SIM" 15.

Note that in alternative embodiments the circuitry and code shown on card 15 is provided not in card format but on an integrated circuit chip which may be mounted on a circuit board by soldering or the like.

The SIM 15 is mounted in the mobile device 10 which may be any apparatus requiring data connectivity over the wireless mobile telephone network. In particular, the processor 14 may interact with the SIM so retrieve data from the SIM (e.g. the IMSI) or permit the SIM to perform particular tasks.

In this way, the SIM 15 may communicate with the communication arrangement 12 and modem 14 in device 10. Information stored by the SIM, in particular the IMSI, may be used to authorize the mobile device 10 to connect to a particular network (e.g. using known procedures, such as in accordance with a GSM or UMTS protocol).

In some examples, it may be the SIM 15 positioned in the mobile device 10 that sends the connectivity information to the connectivity monitoring device 20 via the mobile device 10 and via base station 98 (i.e. rather than the mobile device itself). As before, the connectivity information may be formed as part of an update request.

In some embodiments, the supplementary information or instructions received by the mobile device 10 may be a new IMSI 18 for the SIM 15, to enable the mobile device to connect to a different network. In other or further embodiments, the supplementary information or instructions received by the mobile device may be instructions to alter the communication channel by, for example, switching to a different communication protocol or increasing a power output of the communication arrangement 12.

Different communication channels may be associated with one or more of the following: different networks, e.g. 3G or 4G; different network providers; different encoding mechanisms on a same network; different encryptions; and so on.

Altering a communication channel may comprise changing the identity of the communication channel (i.e. switching to a different communication channel) or adjusting a characteristic of the mobile device, end server or possibly base station on the communication channel (e.g. change a maximum power output by a communication arrangement of the mobile device). The altering may comprise adjusting a protocol of a communication channel (e.g. SMS or USSD) or adjusting an access point for the mobile device or the end server.

In some embodiments, the supplementary information or instructions received by the mobile device may cause the mobile device to alter its behavior. By way of example, if supplementary information indicates that a communication channel is of a low quality or a high cost, the mobile device may reduce an amount of data sent or requested or reduce a frequency at which data is sent.

It will be appreciated that there are many applications, for example data logging and smart meters, where devices require communication with an end server, and although such devices may use a mobile, cellular network there is no need for the devices themselves to be mobile—they can and frequently are fixed in place as is for example the case with a smart meter. Nonetheless, the term mobile device is also used to refer to such devices. Alternatively, the mobile device may be otherwise named a remote device or, optionally, a wireless device. Thus, a mobile device may, for example, comprise a static device adapted to communicate using a wireless communication system, such as a smart home appliance or personal computer. The mobile device may comprise, for example: an automobile; a mobile phone; a cell phone; a medical monitoring device; a smart meter; a smart watch; smart glasses; personal computer; and wireless sensors.

The connectivity monitoring device may be an update server adapted to update a communication channel of the first device. In other embodiments, the connectivity monitoring device only monitors the communication channel (e.g. for review purposes), or to instruct the mobile device to alter its behavior.

An end server may, for example, be a cloud-computing network or a server farm adapted to provide web services to the mobile device. Optionally, the end server may be capable of adjusting a communication channel between the end device and the mobile device (e.g. by instructing the mobile device to switch to a particular encryption scheme).

It will be appreciated that the end sever may comprise a memory having a computer program or code stored thereon. The code may be adapted to cause the end server (e.g. a processor of an end server) to carry out tasks or methods previously described.

The end server may, for example, be provided by known cloud computing service providers or cloud computing platforms such as Amazon Web Services®, Azure® or OpenStack®.

There is herein proposed the concept of a shadow for connectivity information of a mobile device, the shadow being stored on an end server and updated by a connectivity monitoring device. Embodiments may be particularly advantageous for machine-to-machine communications and embodiments utilizing the internet of things.

The connectivity information may comprise data related to: a signal strength of the mobile device; a current network of the mobile device; a location of the mobile device (i.e. an end point of the communication channel); a quality of a communication pathway between the mobile device and the end server; a latency between the mobile device and the end server; a RAT (Radio Access Technology) type used by the mobile device; networks available to the mobile device; a network subscription of the mobile device; an active IMSI of the mobile device; available IMSIs of the mobile device; a cost of at least one communication channel between the mobile device and the end server; a bandwidth of a communication channel; a packet loss between the mobile device and the end server; a public availability of a communication channel; a privacy of a communication channel; a security of a communication channel; a reliability of a communication channel; a number of intermediary or routing devices between the mobile device and the end server; information about intermediary or routing device between the mobile device and the end server (e.g. a type or identity of intermediary or routing devices); an identity of locations through which a communication channel passes and so on.

The connectivity information may comprise historic connectivity information.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device, such as a controller. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

The mobile device may be adapted to wirelessly communicate according to any known wireless communication protocols, such as an infrared link, Zigbee, Bluetooth, a wireless local area network protocol such as in accordance with the IEEE 802.11 standards, a 2G, 3G or 4G telecommunication protocol, and so on. Other formats will be readily apparent to the person skilled in the art.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method of providing an end server with connectivity information of a mobile device able to wirelessly communicate with the end server, the method comprising:
   communicating between the end server and the mobile device through a communication pathway using a communication channel;
   collecting connectivity information at a connectivity monitoring device outside of the communication pathway between the mobile device and the end server by obtaining connectivity information from the mobile device or an intermediary device in the communication pathway between the mobile device and the end server;
   passing the connectivity information from the connectivity monitoring device to the end server; and
   storing the connectivity information in an electronic file at the end server, wherein the electronic file represents the last known state of the connectivity information to the end server; and
   updating, by the end server, a further separate electronic file in the end server with status information relating to the mobile device, wherein the status information is obtained by the end server during a communication between the end server and the mobile device using the communication pathway.

2. The method of claim 1, further comprising adjusting, using the connectivity monitoring device, the communication channel between the mobile device and the end server based on the connectivity information.

3. The method of claim 1, further comprising:
   monitoring, using the connectivity monitoring device, changes to the connectivity information of the mobile device; and
   updating the stored connectivity information based on the changes to the connectivity information of the mobile device.

4. The method of claim 1, wherein the storing the connectivity information comprises:
   associating the connectivity information with security information;
   determining whether the end server is permitted to access the connectivity information based on the security information; and
   in response to successfully determining that the end server is permitted to access the connectivity information, storing the connectivity information in an electronic file at the end server.

5. The method of claim 4, wherein the associating the connectivity information with security information comprises:
   retrieving, using the connectivity monitoring device, security information from the mobile device; and
   associating the retrieved security information with the connectivity information.

6. The method of claim 1, wherein the mobile device communicates with a mobile telephone base station along the communication channel using a main channel and a side channel, wherein the communications pathway between the end server and the mobile device is along the main channel and the mobile device communicates with the connectivity monitoring device using a side channel.

7. The method of claim 1, wherein the connectivity information comprises at least one of the following: a signal strength of the mobile device; a current network of the mobile device; a location of the mobile device; a quality of a communication pathway between the mobile device and the end server; a latency between the mobile device and the end server; a RAT (Radio Access Technology) type used by the mobile device; networks available to the mobile device; a network subscription of the mobile device;
   and an active IMSI of the mobile device.

8. The method of claim 1, wherein the communication pathway bypasses the connectivity monitoring device.

9. A wireless network system comprising:
   a connectivity monitoring device for providing an end server with connectivity information of a mobile device able to communicate with the end server through a communication pathway using a communication channel, the connectivity monitoring device being adapted to:
      monitor the communication channel to collect connectivity information; and
      pass the connectivity information to the end server; and
   the end server adapted to:
      communicate with the mobile device through the communication pathway;
      store the connectivity information, received from the connectivity monitoring device, in an electronic file, wherein the electronic file represents the last known state of the connectivity information to the end server; and
      update, by the end server, a further separate electronic file in the end server with status information relating to the mobile device, wherein the status information is obtained by the end server during a communication between the end server and the mobile device using the communication pathway.

10. The wireless network system of claim 9, further comprising a mobile device adapted to pass connectivity information to the connectivity monitoring device.

11. The wireless network system of claim 9, wherein the connectivity monitoring device is further adapted to adjust the communication channel between the mobile device and the end server based on the connectivity information.

12. The wireless network system of claim 9, wherein the connectivity monitoring device is further adapted to associate the connectivity information with security information and determine whether the end server is permitted to access the connectivity information based on the security information.

13. The wireless network system of claim 9, wherein the connectivity monitoring device is further adapted to retrieve, using the connectivity monitoring device, stored connectivity information from the end server; and control the communication channel between the mobile device and the end server based on the stored connectivity information.

\* \* \* \* \*